United States Patent

Hartlein et al.

[15] 3,639,155
[45] Feb. 1, 1972

[54] DIRT-RESISTANT SILICONE RUBBER

[72] Inventors: Robert C. Hartlein; Harold L. Vincent, both of c/o Dow Corning Corp, Midland, Mich. 48640

[22] Filed: Dec. 1, 1969
[21] Appl. No.: 881,320

[52] U.S. Cl. ................117/138.8 A, 117/72, 117/124 F, 117/132 BS, 117/161 ZA, 260/825
[51] Int. Cl. .................................................B32b 25/20
[58] Field of Search ..................117/138.8 A, 161 ZA; 260/46.5 E, 46.5 G, 825

[56] References Cited

UNITED STATES PATENTS

| | | | |
|---|---|---|---|
| 3,202,634 | 8/1965 | Merker | 260/825 |
| 3,360,425 | 12/1967 | Boone | 260/825 |
| 3,485,662 | 12/1969 | Metevia | 117/161 ZA |
| 3,527,655 | 9/1970 | Ballard | 117/161 ZA |
| 3,529,035 | 9/1970 | Lamoreaux | 260/825 |

*Primary Examiner*—William D. Martin
*Assistant Examiner*—Ralph Husack
*Attorney*—Robert F. Fleming, Jr., Laurence R. Hobey, Harry D. Dingman, Howard W. Hermann and Roger H. Borrousch

[57] ABSTRACT

A silicone rubber having a cured coating on a surface which is exposed to the atmosphere where said coating is a room-temperature vulcanizable organosiloxane block copolymer curable through an acetoxy, ketoxime or alkoxy functionality is resistant to dirt pickup. A room-temperature vulcanizable organosiloxane block copolymer curable through an acetoxy, ketoxime or alkoxy functionality is applied to a silicone rubber surface and allowed to cure to provide a dirt-resistant coating.

7 Claims, No Drawings

DIRT-RESISTANT SILICONE RUBBER

This invention relates to a silicone rubber coated with a dirt-resistant coating and a process for the preparation thereof.

Silicone rubber is a useful material finding utility throughout industry, particularly in the construction industry where the high and low temperature properties of silicone rubber provide many unique applications, where the electrical properties make it useful as insulation and where its ability to seal out moisture makes it useful as a sealant among the other things. In many of these uses, the silicone rubber has a surface which is exposed to the atmosphere and as a result it picks up dirt and soon becomes disgustingly unattractive. This is particularly true where the silicone rubber is used as a building sealant and is exposed to outside atmospheres. The sealant becomes dirty and unattractive and as a result the aesthetic value of the building is much reduced. Thus, the silicone rubber may be a very valuable construction material, except for its property of picking up dirt.

It is therefore an object of the present invention to provide a silicone rubber which is resistant to dirt pickup. It is also an object to provide a process for making silicone rubber resistant to dirt pickup.

This invention relates to a silicone rubber which is resistant to dirt pickup comprising a base of silicone rubber having a cured coating on a surface of the silicone rubber exposed to the atmosphere, said coating being bonded to said silicone rubber and consisting essentially of, in the uncured state, a room-temperature vulcanizable composition stable in the absence of moisture and curable upon exposure to moisture consisting essentially of an organosiloxane block copolymer consisting essentially of (A) 40 to 75 inclusive mol percent of diorganosiloxane units wherein the diorganosiloxane units are bonded through silicon-oxygen-silicone bonds forming a polydiorganosiloxane block having an average of from 15 to 350 inclusive diorganosiloxane units per block, said polydiorganosiloxane being at least 80 mol percent dimethylsiloxane units based on the total number of siloxane units in the polydiorganosiloxane and any remaining units being selected from the group consisting of phenylmethylsiloxane units and monomethylsiloxane units, (B) 15 to 50 inclusive mol percent organosiloxane units having an average formula $$R_xSiO_{\frac{4-x}{2}}$$

where $x$ has a value of from 1 to 1.3 inclusive and R is an organic group selected from the group consisting of aryl radicals, vinyl radicals, methyl radicals, ethyl radicals and propyl radicals, said organic groups being at least 50 percent aryl radicals based on the total number of organic groups in (B), said organosiloxane units comprise a block of at least 3 organosiloxane units and said organosiloxane units being selected from monoorganosiloxane units and diorganosiloxane units, and (C) 3 to 25 inclusive mol percent of end-blocking siloxane units of the formula $$R'SiY_yO_{\frac{3-y}{2}}$$

where $y$ has an average value from 1.8 to 2 inclusive, R' is an organic radical selected from the group consisting of alkyl radicals having from one to five inclusive carbon atoms, phenyl radicals and vinyl radicals and Y is a monovalent radical selected from the group consisting of acetoxy radicals, alkoxy radicals having from one to five inclusive carbon atoms per radical and radicals of the formula $-O-N = X$ wherein X is selected from the group consisting of radicals of the formula

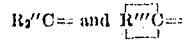

in which each R''' is selected from the group consisting of divalent hydrocarbon radicals and halogenated divalent hydrocarbon radicals and each R'' is a radical selected independently from the group consisting of monovalent hydrocarbon radicals and halogenated monovalent hydrocarbon radicals, the mol percentages of (A), (B) and (C) being based on the total number of siloxane units in the organosiloxane block copolymer.

The silicone rubber base can be any of the silicone rubbers known in the art. The silicone rubber can be heat vulcanized or room-temperature vulcanized. The silicone rubber base is a cured silicone rubber. The silicone rubber base can be in any form, such as a block, a sheet, or any irregular shape. The silicone rubber base can be itself a coating or it can be a sealant in a crack of a building.

The nature of the silicone rubber base is not important. The silicone rubber can be based on polydimethylsiloxane, poly-3,3,3-trifluoropropylmethylsiloxane, polyphenylmethylsiloxane and the like. The silicone rubber is well known in the art and can be purchased commercially.

A surface of the silicone rubber base is coated with a cured room temperature vulcanizable composition as described herein. The amount of coating is that amount sufficient to provide a continuous coating on the surface of the silicone rubber. The maximum thickness of the coating is not critical and economic considerations are the usual limiting factors for the maximum thickness. For most purposes a maximum thickness of 50 mils for the coating is sufficient. A coating of 1 to 20 mil thickness provides excellent dirt resistance and is economically satisfactory.

The best method for coating a silicone rubber is to apply a room temperature vulcanizable block copolymer to the surface of the silicone rubber in the desired thickness and thereafter allow the room-temperature vulcanizable block copolymer to cure by exposure to moisture.

The room-temperature vulcanizable block copolymer can be applied as such or in the form of an organic solvent solution. The organic solvent can be any of those conventionally used with silicones, such as toluene, xylene, diethylether, benzene, chlorothene, cyclohexane, carbon tetrachloride, chloroform, perchloroethylene, chlorobenzene, chlorotoluene, dichlorobenzene, acetone, cyclohexanone, methylethylketone, butyrone, methylisopropylketone, trichloromonofluoromethane, dichlorodifluoromethane, monochlorotrifluoroethane, dichloromonofluoromethane, monochlorodifluoromethane, tetrachlorodifluoroethane, trichlorotrifluoroethane and dichlorotetrafluoroethane. The solvent solutions of the room-temperature vulcanizable block copolymer can be used as a dipping bath, a spray, an aerosol spray, and the like. The method of application is not critical as long as a continuous coating can be applied to the silicone rubber. The thickness of the coating can be controlled by the concentration of the room-temperature vulcanizable block copolymer in the organic solvent. For example, thick coatings can be applied without solvent and very thin coatings can be applied from dilute solutions containing the room-temperature vulcanizable block copolymer in amount such as 1 to 10 weight percent.

After the room-temperature vulcanizable block copolymer is applied, the coated silicone rubber is exposed to moisture to cure the coating. The temperature can vary widely, however ambient temperatures are quite satisfactory. The coating when used in certain applications, such as coating silicone rubber used as a sealant in a building, will be exposed to moisture merely by the application of the room-temperature vulcanizable block copolymer and evaporation of any solvents.

The room-temperature vulcanizable composition of the present invention can be prepared by several methods. The best method is to couple a hydroxyl terminated polydiorganosiloxane with an aromatic containing organosiloxane resin having hydroxyl groups by reaction with a trifunctional organosilane. The resulting block copolymer is hydroxylated and this block copolymer is then reacted with monoorganotriketoxime silanes, monoorganotrialkoxysilane or monoorganotriacetoxysilane to yield the room-temperature vulcanizable composition. Alternatively, the hydroxyl terminated polydiorganosiloxane can be cohydrolyzed with a trifunctional organosilane in the proper proportions. In the methods for making the room-temperature vulcanizable composition of the present invention, conditions which cause siloxane bond rearrangement should be avoided.

The preparations of the room-temperature vulcanizable compositions of the present invention begin with a polydiorganosiloxane which is terminated by hydroxyl radicals of hydrolyzable groups. The polydiorganosiloxanes suitable for the present invention have an average of from 15 to 350 diorganosiloxane units per molecule, preferably from 25 to 100 diorganosiloxane units per molecule. The polydiorganosiloxanes are at least 80 mol percent dimethylsiloxane units. Any remaining siloxane units can be phenylmethylsiloxane units or monomethylsiloxane units. The polydiorganosiloxanes preferably are all dimethylsiloxane units. The phenylmethylsiloxane units or the monomethylsiloxane units are present in amounts of 10 mol percent or less each. Preferably, the monomethylsiloxane is absent or present in small amounts, such as less than 2 mol percent. The terminating groups for the polydiorganosiloxanes can be hydroxyl radicals or any hydrolyzable group. Examples of hydrolyzable groups include halogen such as chlorine, alkoxy such as methoxy, and ethoxy, acyloxy such as acetoxy, ketoxime such as methylethylketoxime and the like.

The polydiorganosiloxanes are employed in the preparation to provide the final room-temperature vulcanizable composition with from 40 to 75 mol percent diorganosiloxane units derived from the polydiorganosiloxane, preferably from 50 to 70 mol percent. The mol percent of diorganosiloxane units includes any quantity of monomethylsiloxane units or phenylmethylsiloxane units in the polydiorganosiloxane. The polydiorganosiloxane forms one of the blocks of the block copolymer of the present invention. Since siloxane bond rearrangement conditions are avoided in the preparation of the room temperature vulcanizable composition of the present invention, the polydiorganosiloxanes essentially retain their original composition except for the terminating functional groups, as illustrated by the hydroxyl radicals and hydrolyzable groups. The polydiorganosiloxanes are well known in the art and can be obtained commercially.

The other block of the block copolymer of the present invention can be represented by an average unit formula $$R_xSiO_{\frac{4-x}{2}}$$

where R is an aryl radical, vinyl methyl, ethyl or propyl and $x$ has an average value of from 1 to 1.3. Any aryl radical is suitable for the present invention and include, for example, such species as phenyl, tolyl, xylyl, xenyl, naphthyl and anthracyl. The organic radicals which are represented in the formula by R are 50 percent aryl and preferably at least 80 percent of the organic radicals are aryl. The organosiloxane units of (B) can all be the same, aryl, or can be mixtures of various organosiloxane units, however, the organosiloxane units are monoorganosiloxane units or diorganosiloxane units. Illustrative examples of the organosiloxane units in (B) are monoorganosiloxane units such as, phenylsiloxane, tolylsiloxane, xylylsiloxane, xenylsiloxane, naphthylsiloxane, methylsiloxane, vinylsiloxane, ethylsiloxane and propylsiloxane, and diorganosiloxane units such as dimethylsiloxane, diethylsiloxane, methylvinylsiloxane, diphenylsiloxane, dinaphthylsiloxane, methylphenylsiloxane, methylethylsiloxane, methylpropylsiloxane, methyltolylsiloxane, methylnaphthylsiloxane, ethylphenylsiloxane, propyltolylsiloxane, ethylpropylsiloxane and methylxenylsiloxane. Small amounts of other siloxane units, such as triorganosiloxane units and $SiO_2$ units, as well as, monoorganosiloxane units and diorganosiloxane units with other organic groups can be tolerated up to amounts of 1 or 2 mol percent without departing from the present invention.

The organosiloxane units of block (B) are present in amounts sufficient to provide the room-temperature vulcanizable composition of the present invention with from 15 to 50 mol percent organosiloxane units, preferably from 20 to 40 mol percent.

Block (B) consists of at least 3 organosiloxane units per block. The average size of polymer block (B) is dependent upon the method of preparation and also upon the average size of the polydiorganosiloxane blocks of (A) and the mol percentage of organosiloxane units of (B).

The end-blocking siloxane units can be units of the formula $$R'SiY_yO_{\frac{3-y}{2}}$$

where $y$ is from 1.8 to 2 inclusive, R' is an alkyl of 1 to 5 inclusive carbon atoms, phenyl or vinyl, and Y is acetoxy, ketoxime or alkoxy. The alkyl radicals include methyl, ethyl, propyl, isopropyl, butyl and pentyl, for example.

The end-blocking ketoxime siloxane units of (C) are represented by the average unit formula $$R'Si(O-N=X)_yO_{\frac{3-y}{2}}$$

where $y$ and R' are defined above and X is selected from the group consisting of radicals of the formula

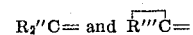

in which each R''' is selected from the group consisting of divalent hydrocarbon radicals and halogenated divalent hydrocarbon radicals and each R'' is a radical selected independently from the group consisting of monovalent hydrocarbon radicals and halogenated monovalent hydrocarbon radicals. The alkyl radicals of R' include methyl, ethyl, propyl, isopropyl, butyl and pentyl. R'' can be any monovalent hydrocarbon radical or any halogenated monovalent hydrocarbon radical. More specifically R'' can be, for example, any alkyl radical such as methyl, ethyl, isopropyl, and octadecyl; any alkenyl radical such as vinyl and decenyl; any cycloalkyl radical such as cyclohexyl radicals, any cycloalkenyl radical such as cyclopentyl; any aryl radical such as phenyl and naphthyl radicals, any aralkyl radical such as benzyl and any alkaryl radicals such as tolyl. Any of the monovalent hydrocarbon radicals can be halogenated to give radicals such as tolyl. Any of the monovalent hydrocarbon radicals can be halogenated to give radicals such as, chloromethyl, 3,3,3-trifluoropropyl, perchlorophenyl and 2,4-dibromobenzyl radicals all of which are operative.

R''' can be any divalent hydrocarbon radical or divalent halogenated hydrocarbon radical in which the two valences are attached to the C of the C = NO— group. R''' can be, for example, $-CH_2(CH_2)_3CH_2-$, $-CH_2(CH_2)_4CH_2-$,

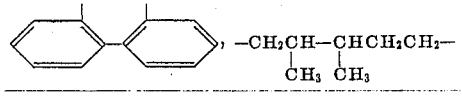

and $-CF_2(CF_2)_2CF_2-$. A
Additional examples of R'' and R''' can be found in U.S. Pat. No. 3,184,427 and No. 3,189,576, which are incorporated by reference.

The end-blocking ketoxime siloxane units can be illustrated by $CH_3Si[ON = C(CH_2CH_3)(CH_3)]_2O_{0.5}$, $CH_3Si[ON = C(CH_3)_2]_2O_{0.5}$, $CH_3CH_2Si[ON = C(CH_3)_2]_2O_{0.5}$,

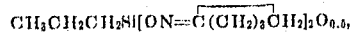

$(CH_3)_2CHCH_2Si[ON = C(C_6H_5)(CH_3)]_2O_{0.5}$, $CH_3(CH_2)_4Si[ON = C(CH_2CH_3)(CH_3)]b2O_{0.5}$, $C_6H_5Si[ON = C(CH_3)_2]_2O_{0.5}$ $CH_2 = CHSi[ON = C(CH_2CH_3)(CH_3)]_2O_{0.5}$, $CH_3Si[ON = C(CH_3)_2]O$, $CH_2 = CHSi[ON = C(CH_2CH_3)(CH_3)]O$ and $C_6H_5Si[ON = C(CH_2CH_3)(CH_3)]O$. The end-blocking ketoxime siloxane units are essentially all monoorgano diketoxime siloxane units with the exception that some of the end-blocking ketoxime silanes used in the preparation can react with, for example, two hydroxyl radicals and thus small amounts of monoroganomonoketoxime siloxane units can be present.

The end-blocking acetoxysiloxane units of (C) are represented by the average unit formula

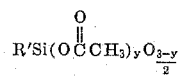

where $y$ and $R'$ are defined above. The end-blocking acetoxysiloxane units can be illustrated by methyldiacetoxysiloxane, ethyldiacetoxysiloxane, propyldiacetoxysiloxane, butyldiacetoxysiloxane, pentyldiacetoxylsiloxane, methylmonoacetoxysiloxane, ethylmonoacetoxysiloxane, phenyldiacetoxysiloxane, vinyldiacetoxysiloxane, propylmonoacetoxysiloxane, phenylmonoacetoxysiloxane, butylmonoacetoxysiloxane, vinylmonoacetoxysiloxane and pentylmonoacetoxysiloxane. The end-blocking acetoxysiloxane units are essentially all monoorganodiacetoxysiloxane units with the exception that some of the end-blocking acetoxysilanes used in the preparation can react with, for example, two hydroxyl radicals and thus small amounts of monoorganomonoacetoxysiloxane units can be present.

The end-blocking alkoxysiloxane units of (C) are represented by the average unit formula

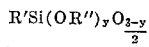

where $y$ and $R'$ are defined above and $R''$ is an alkyl radical having from one to five inclusive carbon atoms. The alkyl radicals include both straight and branched radicals, such as methyl, ethyl, propyl, isopropyl, butyl and pentyl. The end-blocking alkoxysiloxane units can be illustrated by methyldimethoxysiloxane, ethyldimethoxysiloxane, methyldiethoxysiloxane, methylethoxymethoxysiloxane, propyldiisopropoxysiloxane, propyldimethoxysiloxane, butyldimethoxysiloxane, pentyldimethoxysiloxane, methyldipentoxysiloxane, methylmonomethoxysiloxane, ethylmonomethoxysiloxane, phenyldimethoxysiloxane, phenyldiethoxysiloxane, vinyldimethoxysiloxane, vinyldiisopropoxysiloxane, vinyldiethoxysiloxane, propylmonoethoxysiloxane, phenylmonobutoxysiloxane, butylmonomethoxysiloxane, vinylmonopropoxysiloxane and pentylmonomethoxysiloxane. The end-blocking alkoxysiloxane units are essentially all monoorganodialkoxysiloxane units with the exception that some of the end-blocking alkoxysilanes used in the preparation can react with, for example, two hydroxyl radicals and thus small amounts of monoorganomonoalkoxysiloxane units can be present. The end-blocking siloxane units (C) are present in amounts sufficient to provide the room-temperature vulcanizable composition with from 3 to 25 inclusive mol percent based on the total number of siloxane units in the organosiloxane block copolymer. Preferably from 4 to 20 inclusive mol percent of the end-blocking siloxane units are present.

In the preparation of the room-temperature vulcanizable composition of the present invention a block copolymer is first prepared consisting essentially of the blocks described in (A) and (B). There are a number of methods known for the preparation of the block copolymer described by (A) and (B). The best method for preparing the block copolymer is to react, under anhydrous conditions a hydroxyl terminated polydiorganosiloxane with a trifunctional silane such as, methyltriacetoxysilane, phenyltriacetoxysilane, vinyltriacetoxysilane, methyltri(methylethylketoxime)silane, vinyl-tri(methylethylketoxime)silane, phenyltrimethoxysilane, methyltriethoxysilane and the like. Sufficient trifunctional silane is added to provide 1 mole of silane per mole of hydroxyl of the polydimethylsiloxane. The reaction product is a monoorganodifunctionalsiloxy end-blocked polydiorganosiloxane. The monoorganodiketoxime siloxy end-blocked polydiorganosiloxanes are further described in U.S. Pat. No. 3,184,427 and U.S. Pat. No. 3,189,576, which are hereby incorporated by reference. The monoorganodiacetoxysiloxy end-blocked polydiorganosiloxanes are further described in U.S. Pat. No. 3,035,016, which is hereby incorporated by reference. The monoorganodialkoxysiloxy end-blocked polydiorganosiloxanes are further described in U.S. Pat. No. 3,161,614 and U.S. Pat. No. 3,170,894 which are hereby incorporated by reference.

The monoorganodifunctional siloxy end-blocked polydiorganosiloxane is then coupled to a hydroxylated organosiloxane which falls within the scope defined in (B). The coupling can take place in the presence of suitable catalyst for such reactions as described in the patents cited above. The resulting product is a hydroxylated organosiloxane block copolymer having from 0.5 to 5 inclusive weight percent hydroxyl radicals, preferably from 1 to 4.5 inclusive weight percent hydroxyl radical.

The hydroxylated organosiloxane block copolymer is then end-blocked with silanes of the formula $R'SiY_3$ where $R'$ and $Y$ are defined above. The silanes include, for example, ketoxime silanes such as $CH_3Si[ON = C(CH_3)_2]_3$, $CH_3Si[ON = C(CH_2CH_3)(CH_3)]_3$, $C_6H_5Si[ON = C(CH_3)_2]_3$, $CH_2CHSi[ON=(CH_2CH_3)(CH_3)]_3$, $CH_3CH_2Si[ON = C(C_6H_5)(CH_3)]_3$,

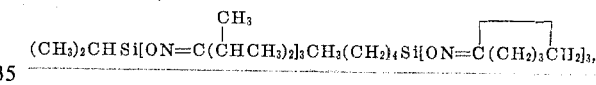

$CH_2 = CHSi[ON = C(CH = CH_2)(C_6H_5)]_3$ and others as described in U.S. Pat. No. 3,189,576, acetoxysilanes such as methyltriacetoxysilane, ethyltriacetoxysilane, propyltriacetoxysilane, butyltriacetoxysilane, phenyltriacetoxysilane, pentyltriacetoxysilane and vinyltriacetoxysilane; and alkoxysilanes such as methyltrimethoxysilane, ethyltrimethoxysilane, propyltrimethoxysilane, butyltrimethoxysilane, phenyltrimethoxysilane pentyltrimethoxysilane, vinyltrimethoxysilane, methyltriethoxysilane, ethyltriethoxysilane, phenyltriethoxysilane, butyltripropoxysilane, pentyltriisopropoxysilane, vinyltributoxysilane, vinyltripentoxysilane, methyltripentoxysilane, ethyltributoxysilane, methyldimethoxyethoxysilane, methyldiethoxymethoxysilane, ethyldiethoxymethoxysilane and phenyltripropoxysilane. Mixtures of two or more silanes can be used. This final step should be carried out under anhydrous conditions. The resulting product is the room-temperature vulcanizable composition of the present invention. When alkoxysilanes are used to endblock the hydroxylated organosiloxane block copolymer it is preferred to use a catalyst of organoamino and organotitanate where they are added separately.

In any of the processes described above the reactions can be carried out either in the presence or absence of organic solvents and at temperatures ranging from below room temperature to the boiling point of the mixture. The reactions are carried out at temperatures from −30° to 130° C., preferably from 20° to 50° C.

The room-temperature vulcanizable compositions can be prepared by reacting under anhydrous conditions a hydroxylated organosiloxane block copolymer within the limits set forth in (A) and (B) with a silane of the formula $R'SiY_3$ where $R'$ and $Y$ are defined above. The hydroxylated organosiloxane block copolymer would have the following composition. A polydiorganosiloxane block as defined in (A) is present in an amount of from 44.4 to 83.4 mol percent, the organosiloxane block defined in (B) is present in an amount of from 16.6 to 55.6 mol percent and the hydroxylated organosiloxane block copolymer has from 0.5 to 5 weight percent silicon-bonded hydroxyl radicals. The amount of silane reacted with the hydroxylated organosiloxane block copolymer is sufficient to provide from 3 to 25 mol percent based on the total number of siloxane units in the resulting product and sufficient enough to provide at least one molecule of silane per hydroxyl radical in the hydroxylated organosiloxane block copolymer.

The hydroxylated organosiloxane block copolymers suitable for use in the present invention are known in the art and can be prepared by a number of methods. Additional details for the preparation of the hydroxylated organosiloxane block copolymers can be found in U.S. Pat. Nos. 3,280,214, 3,294,718, 3,328,481 and 3,436,437 which are hereby incorporated by reference.

The room-temperature vulcanizable compositions which are the monoorganodifunctional siloxy end-blocked organosiloxane block copolymers described above are coated on cured silicone rubber and thereafter cured. The silicone rubber coated with a cured coating of the monoorganodifunctionalsiloxy end-blocked organosiloxane block copolymer has excellent resistance to dirt pickup which is totally unexpected from the prior art compositions which cure at room temperature through acetoxy, ketoxime or alkoxy groups. The surfaces of a silicone rubber coated with said block copolymers are resistant to dirt pickup and provide a clean and new appearing surface over extended periods of time exceeding 1 year and even in cases where dirt pickup is observed the amount of dirt pickup is much less than when a silicone rubber without the coating of said block copolymer is used. In those cases where slight dirt pickup is observed, the surface can easily be cleaned with only water.

In addition to resistance to dirt pickup, the silicone rubber coated with a cured coating of the monoorganodifunctionalsiloxy end-blocked organosiloxane block copolymer also increases the useful shatterproof life of shatterproof light bulbs. The light bulbs can be incandescent lamps, fluorescent lamps and the like. The light bulbs are first coated with a silicone rubber and then over the cured silicone rubber, a coating of said block copolymer is applied and cured. The silicone rubber coating makes the light bulbs safe, particularly when shattered from being struck. The coating of said block copolymer is applied to prevent the silicone rubber coating from picking up dirt. At the same time the coating of said block copolymer also increases the useful shatterproof life of the light bulb by as much as 30 percent.

The process of making a silicone rubber resistant to dirt pickup comprises applying to at least one surface exposed to an atmosphere a monoorganodifunctionalsiloxy end-blocked organosiloxane block copolymer as described herein, a thin continuous coating of said block copolymer and thereafter curing said coating of said block copolymer. Where acetoxy end-blocking units are present the coating is preferably greater than 15 mils thick.

The block copolymer can be applied in any conventional manner, in an organic solvent solution or without solvent, by spreading, dipping, spraying and the like. The block copolymer cures by exposure to atmospheric moisture and thus this method is useful for applying the coating on silicone rubber such as sealants which are placed in large structures such as buildings, airplanes, and the like, where heat curing is difficult to accomplish.

The following examples are for illustrative purposes only and should not be construed as limiting the present invention which is properly delineated in the claims.

EXAMPLE 1

A hydroxyl end-blocked polydimethylsiloxane having an average of 34 dimethylsiloxane units per molecule was mixed with monophenyltriacetoxysilane in a toluene solution. The toluene was about 72 weight percent of the solution. This mixture was allowed to react for 1 hour at room temperature using mild agitation. To the resulting monophenyldiacetoxysiloxy end-blocked polydimethylsiloxane, a hydroxylated phenylsiloxane resin was added and the mixture was heated to 85° C. for 2 hours. The hydroxylated phenylsiloxane resin had 90 mol percent monophenylsiloxane units and 10 mol percent phenylmethylsiloxane units. The resulting hydroxylated organosiloxane block copolymer had 52 mol percent dimethylsiloxane units and 48 mol percent phenyl containing siloxane units. The hydroxylated organosiloxane block copolymer was end-blocked with methyltriacetoxysilane by allowing the mixture to react 1 hour at room temperature. Excess methyltriacetoxysilane was used. The resulting monomethyldiacetoxysiloxy end-blocked organosiloxane block copolymer was recovered by stripping the toluene, byproduced acetic acid and the excess methyltriacetoxysilane from the product under reduced pressure to 100° C.

A commercially available sealant based on polydimethylsiloxane and cured through a ketoxime cross-linker was coated on an aluminum panel and allowed to cure at room temperature. After the sealant had cured a thin coating of the monomethyldiacetoxysiloxy end-blocked organosiloxane block copolymer prepared above was coated over the sealant and allowed to cure for 7 days at room temperature. The gloss was then determined by a glossometer at a 90° angle. The initial gloss was 87. The coated panel was then exposed to an outside industrial atmosphere for 6 months. The gloss was then checked and was found to be 82. This panel was slightly dirty but cleaned easily by washing with water. An identical panel was coated with the sealant but was not over coated with the monomethyldiacetoxysiloxy end-blocked organosiloxane block copolymer. The initial gloss was 75 and after 6 months exposure to an outside industrial atmosphere, the gloss was 15. The sealant was dirty and could not be cleaned with water.

EXAMPLE 2

A mixture of 590.0 g. of a hydroxyl end-blocked polydimethylsiloxane having an average of 34 dimethylsiloxane units per molecule and 1491.4 g. of vinyltri(methylethylketoxime)silane was added and the mixture was allowed to react for 1 hour at room temperature. To the resulting monovinyldi(methylethylketoxime)siloxy end-blocked polydimethylsiloxane, 731.0 g. of a hydroxylated phenylsiloxane resin toluene solution was added. The toluene solution was 56.1 weight percent hydroxylated phenylsiloxane resin having 90 mol percent monophenylsiloxane units and 10 mol percent phenylmethylsiloxane units. The resulting mixture was heated to 65° C. for 1 hour and then cooled to room temperature. To the resulting hydroxylated organosiloxane block copolymer, 471.4 g. of vinyltri(methylethylketoxime)silane was added and the mixture was allowed to react for 15 minutes at room temperature before the volatiles were removed by stripping to 100° C. under reduced pressure to yield a monovinyldi(methylethylketoxime)siloxy end-blocked organosiloxane block copolymer.

An aluminum panel was coated with the same sealant as described in example 1 and was then coated over with a thin layer of the monovinyldi(methylethylketoxime)siloxy end-blocked organosiloxane block copolymer. The coated panel was coated and cured as described in example 1 and then exposed to an outside industrial atmosphere. The initial gloss was 90 and the gloss after 6 months exposure was 79. The coated panel was slightly dirty, but cleaned easily with water.

EXAMPLE 3

To a mixture of 35.9 parts by weight of a hydroxyl end-blocked polydimethylsiloxane having an average of 34 dimethylsiloxane units per molecule and sufficient toluene to make the final product 40 weight percent solids, 8.0 parts by weight of methyltri(methylethylketoxime)silane was added and the mixture was allowed to react for 1 hour at 25° C. To the resulting monomethyldi(methylethylketoxime)siloxy end-blocked polydimethylsiloxane toluene solution, 35.9 parts by weight of a hydroxylated phenylsiloxane resin having 90 mol percent monophenylsiloxane units and 10 mol percent diphenylsiloxane units was added and the resulting mixture was allowed to react over a 1.5 hour period while the temperature increased from 25° C. to 81° C. to produce a hydroxylated organosiloxane block copolymer in a toluene solution. This solution was cooled to room temperature and 20.2 parts by weight of methyltrimethoxysilane and 0.5 part by weight of tetraisopropyltitanate in 5 parts by weight toluene was added and the mixture was allowed to react for 30 minutes and increase in temperature to 51° C. Thereafter, 0.5 part by weight normal hexylamine in 5 parts by weight toluene was added to this solution and the solution was heated to 95° C. for 1 hour and 45 minutes removing volatile material such as the byproduced methanol. The resulting solution was then vacuum stripped to 125° C. The resulting product was a monomethyldimethoxysiloxy end-blocked organosiloxane block copolymer. To the monomethyldimethoxysiloxy end-blocked organosiloxane block copolymer, 0.5 part by weight of tetrabutyltitanate was added and the composition was sealed in tubes to prevent contact with moisture. The composition cures upon exposure to moisture, but is entirely stable in the anhydrous condition.

The resulting composition was used to coat over a commercially available silicone rubber which was coated on a standard 100-watt incandescent light bulb. The light bulb was placed in a high dirt pickup area for 9 days with the following results. The commercially available silicone rubber coating was used to provide a bulb which is safe when shattered.

LOSS OF LIGHT TRANSMISSION

| Exposure | Percent | | | |
|---|---|---|---|---|
| | Uncoated bulb | Silicone rubber coated bulb | Another competitive silicone rubber coated bulb | Silicone rubber coated bulb with overcoat |
| None | 0.0 | 0.5 | 5.0 | 0.5 |
| After 9 days | 0.6 | 3.6 | 5.3 | 1.2 |
| Total | 0.6 | 4.1 | 10.3 | 1.7 |

The incandescent light bulbs have a useful shatterproof life up to 1,000 hours when coated with the commercially available silicone rubber as determined by a test in which the bulb is on for 23 hours and off for 1 hour. The use of the monomethyldimethoxysiloxy end-blocked organosiloxane block copolymer increases the useful life of the bulb to 1,300 hours.

EXAMPLE 4

A. To a mixture of 426.8 g. of a hydroxyl end-blocked polydimethylsiloxane having an average of 34 dimethylsiloxane units per molecule and 963.5 g. of reagent grade toluene, 95.1 g. of methyltri(methylethylketoxime)silane was added and allowed to react for 1 hour at 25° C. To the resulting monomethyldi(methylethylketoxime)siloxy end-blocked polydimethylsiloxane toluene solution, 1012.8 g. of a solution of 56.1 weight percent hydroxylated phenylsiloxane resin having 90 mol percent monophenylsiloxane units and 10 mol percent phenylmethylsiloxane units in toluene was added and the resulting mixture was allowed to react over a 1.5 hour period while the temperature increased from 25° C. to 81° C. to produce a hydroxylated organosiloxane block copolymer having 3 weight percent silicon-bonded hydroxyl radicals in a toluene solution. This solution was cooled to room temperature and 450.2 g. of methyltrimethoxysilane and 6.25 g. of tetraisopropyltitanate in 10 g. of toluene was added and the mixture was allowed to react for 30 minutes and increase in temperature to 51° C. Thereafter, 6.25 g. of normal hexylamine in 10 g. of toluene was added to the solution and the solution was heated to 95° C. for 1 hour and 45 minutes removing volatile materials such as the byproduced methanol. The resulting solution was then vacuum stripped to 125° C. The resulting product was a monomethyldimethoxysiloxy end-blocked organosiloxane block copolymer. To the monomethyldimethoxysiloxy end-blocked organosiloxane block copolymer, 12.6 g. of tetraisopropyltitanate was added and the composition was sealed in tubes to prevent contact with moisture. The composition cures upon exposure to moisture, but is entirely stable in the anhydrous condition.

B. A monomethyldimethoxysiloxy end-blocked organosiloxane block copolymer was prepared as described above except instead of 1012.8 g. of the hydroxylated phenylsiloxane resin only 760.8 g. was used.

C. A monomethyldimethoxysiloxy end-blocked organosiloxane block copolymer was prepared as described in A. above except 250.0 g. of a hydroxy end-blocked fluid having about 4.5 weight percent silicon-bonded hydroxyl radical and having 45 mol percent dimethylsiloxane units, 30 mol percent diphenylsiloxane units and 25 mol percent monophenylsiloxane units was added at the same time as the methyltrimethoxysilane.

D. A monomethyldimethoxysiloxy end-blocked organosiloxane block copolymer was prepared as described in B. above except 250.0 g. of the hydroxyl end-blocked fluid described in C. above was added at the same time as the methyltrimethoxysilane.

E. For comparative purposes a standard commercially available room-temperature vulcanizable silicone sealant curing through methoxy functionality was used.

F. The dirt pickup and dirt retention was determined by coating an aluminum panel and exposing the coated panel after the compositions cure to an industrial outdoor atmosphere. The panels coated with monomethyldimethoxysiloxy end-blocked organosiloxane block copolymers of A., B., C. and D., all had >100 gloss initially and after 4 months exposure as determined by a 90° angle gloss determination using a glossometer. The sealant of E. had an initial gloss of 60 and only a gloss of 24 after 4 months exposure. The sealant of E. retained the dirt and did not wash clean. Equivalent results were obtained when coated over a cured silicone rubber.

EXAMPLE 5

A. A monomethyldiacetoxysiloxy end-blocked organosiloxane block copolymer was prepared as described in example 1, except that the hydroxylated organosiloxane block copolymer had 51 mol percent dimethylsiloxane units and 49 mol percent phenyl-containing siloxane units.

B. A monomethyldiacetoxysiloxy end-blocked organosiloxane block copolymer was prepared as described in example 1, except that the hydroxylated organosiloxane block copolymer had 57 mol percent dimethylsiloxane units and 43 mol percent phenyl-containing siloxane units.

C. A monomethyldiacetoxysiloxy end-blocked organosiloxane block copolymer was prepared as described in example 1, except that the hydroxylated organosiloxane block copolymer had 61 mol percent dimethylsiloxane units and 39 mol percent phenyl-containing siloxane units.

D. A monomethyldiacetoxysiloxy end-blocked organosiloxane block copolymer was prepared as described in example 1, except that the hydroxylated organosiloxane block copolymer had 67 mol percent dimethylsiloxane units and 33 mol percent phenyl-containing siloxane units.

E. For comparative purposes, a commercially available automotive sealant based on polydimethylsiloxane and cured through acetoxysilane was used.

F. For comparative purposes, a commercially available building sealant based on polydimethylsiloxane and cured through acetoxysilane was used.

G. The compositions of A., B., C., D., E. and F. were cured on aluminum panels which were then exposed to outside industrial atmosphere as described in example 1. The gloss was determined as described in example 1, initially and after exposure.

| Test panel coating | Exposure, months | Initial gloss | Gloss after exposure | Dirt retention |
|---|---|---|---|---|
| A | 16 | >100 | >100 | None. |
| B | 16 | >100 | 90 | Very slight. |
| C | 7 | >100 | >100 | Do. |

| Test panel coating | Exposure, months | Initial gloss | Gloss after exposure | Dirt retention |
|---|---|---|---|---|
| D | 7 | >100 | >100 | Do. |
| E | 16 | >100 | 27 | High. |
| F | 7 | 55 | 15 | Do. |

Example 6

A. A monovinyldi(methylethylketoxime)siloxy end-blocked organosiloxane block copolymer was prepared as described in example 2, except that 1051.7 g. of the hydroxylated phenylsiloxane resin toluene solution was used.

B. A monovinyldi(methylethylketoxime)siloxy end-blocked organosiloxane block copolymer was prepared as described in example 2, except that 566.8 g. of the hydroxylated phenylsiloxane resin toluene solution was used.

C. The compositions of A. and B. were coated on aluminum panels and cured as described in example 2. The gloss initially and after 7 months exposure to an outside industrial atmosphere was determined. The gloss, both initially and after exposure was >100 and there was no dirt pickup.

The hydroxylated organosiloxane block copolymers in the foregoing examples have from 2 to 4.5 weight percent silicone-bonded hydroxyl radicals.

We claim:

1. A silicone rubber which is resistant to dirt pickup comprising a base of silicone rubber having a cured coating on a surface of the silicone rubber exposed to the atmosphere said coating being bonded to said silicon rubber and consisting essentially of in the uncured state a room-temperature vulcanizable composition stable in the absence of moisture and curable upon exposure to moisture consisting essentially of an organosiloxane block copolymer consisting essentially of A. 40 to 75 inclusive mol percent of diorganosiloxane units wherein the diorganosiloxane units are bonded through silicon-oxygen-silicon bonds forming a polydiorganosiloxane block having an average of from 15 to 350 inclusive diorganosiloxane units per block, said polydiorganosiloxane being at least 80 mol percent dimethylsiloxane units based on the total number of siloxane units in the polydiorganosiloxane and any remaining units being selected from the group consisting of phenylmethylsiloxane units and monomethylsiloxane units;

B. 15 to 50 inclusive mol percent organosiloxane units having an average formula $$R_xSiO_{\frac{4-x}{2}}$$

where $x$ has a value of from 1 to 1.3 inclusive and R is an organic group selected from the group consisting of aryl radicals, vinyl radicals, methyl radicals, ethyl radicals and propyl radicals, said organic groups being at least 50 percent aryl radicals based on the total number of organic groups in (B), said organosiloxane units comprise a block of at least three organosiloxane units and said organosiloxane units being selected from monoorganosiloxane units and diorganosiloxane units; and C. 3 to 25 inclusive mol percent of end-blocking siloxane units of the formula $$R'SiY_yO_{\frac{3-y}{2}}$$

where $y$ has an average value from 1.8 to 2 inclusive, R' is an organic radical selected from the group consisting of alkyl radicals having from one to five inclusive carbon atoms, phenyl radicals and vinyl radicals and Y is a monovalent radical selected from the group consisting of acetoxy radicals, alkoxy radicals having from one to five inclusive carbon atoms per radical, and radicals of the formula —O—N = X wherein X is selected from the group consisting of radicals of the formula $$R''_2C= \text{ and } R'''\underline{\quad}C=$$

in which each R''' is selected from the group consisting of divalent hydrocarbon radicals and halogenated divalent hydrocarbon radicals and each R'' is a radical selected independently from the group consisting of monovalent hydrocarbon radicals and halogenated monovalent hydrocarbon radicals, the mol percentages of (A), (B) and (C) being based on the total number of siloxane units in the organosiloxane block copolymer.

2. The silicone rubber which is resistant to dirt pickup in accordance with claim 1 in which the base of silicone rubber is a room-temperature vulcanizable silicone rubber.

3. The silicone rubber which is resistant to dirt pickup in accordance with claim 2 in which the room-temperature vulcanizable silicone rubber is a sealant.

4. The silicone rubber which is resistant to dirt pickup in accordance with claim 1 in which (A) is present in an amount of from 50 to 70 inclusive mol percent and the polydiorganosiloxane is polydimethylsiloxane having from 25 to 100 dimethylsiloxane units per block, (B) is present in an amount of from 20 to 40 inclusive mol percent and the aryl radicals are phenyl radicals and (C) is present in an amount of from 4 to 20 inclusive mol percent.

5. The silicone rubber which is resistant to dirt pickup in accordance with claim 4 in which Y is acetoxy.

6. The silicone rubber which is resistant to dirt pickup in accordance with claim 4 in which Y is ketoxime.

7. The silicone rubber which is resistant to dirt pickup in accordance with claim 4 in which Y is alkoxy.

* * * * *